UNITED STATES PATENT OFFICE.

LORENZ ACH, OF MANNHEIM, AND ALBERT ROTHMANN AND HANS HATZIG, OF HEIDELBERG, GERMANY, ASSIGNORS TO FARBWERKE VORM. MEISTER LUCIUS & BRUENING, OF HÖCHST-ON-THE-MAIN, GERMANY, A FIRM.

ART OF PREPARING NITRATED AMINOBENZOL ARSINIC ACID.

1,163,496.      Specification of Letters Patent.      Patented Dec. 7, 1915.

No Drawing.      Application filed December 20, 1913. Serial No. 807,908.

*To all whom it may concern:*

Be it known that we, LORENZ ACH, ALBERT ROTHMANN, and HANS HATZIG, citizens of the German Empire, the said ACH residing at Mannheim, Baden, and the said ROTHMANN and HATZIG at Heidelberg, Baden, Germany, have invented certain new and useful Improvements in the Art of Preparing Nitrated Aminobenzol Arsinic Acid, and that we do hereby declare the following to be a full, clear, and exact description of the invention, such as will enable others skilled in the art to which it appertains to make and use the same.

Mononitro-aminobenzenearsinic acids and dinitro-aminobenzenearsinic acids, which are of considerable importance in the manufacture of valuable medicinal arsenic-compounds, have heretofore been made by the nitration of aminobenzene arsinic acids or of their N-acidyl derivatives, such processes having been described in German Patents Nos. 231969 and 232879, and also in *Berichte der Deutschen Chemischen Gesellschaft*, vol. 44 (1911) p. 3093 and vol. 45 (1912), p. 56. We have found that these nitro-acids, as well as derivatives thereof in which substitutions have been effected in the amino group, may be obtained in a new way admitting of very extensive variations, namely by reacting on metanitroparachlorobenzene arsinic acid or upon meta-meta-dinitroparachlorobenzene arsinic acid with a compound comprising the amino group, under which term we include not only ammonia and primary and secondary amins, but compounds of the type of amino-acetic acid, of benzene sulfonamid, or of piperidin, as well. In other words, we may use as such a reagent a compound having the general formula $HNR_1R_2$, wherein each of the symbols $R_1$ and $R_2$ denotes a monovalent radical, the term "radical" including an element as well as a group of elements. In this way we have succeeded in introducing into the benzene-nucleus the monovalent residue $$-N{<}^{R_1}_{R_2}$$

where $R_1$ designates a monovalent radical or element such as alkyl or hydrogen and $R_2$ also designates a monovalent radical or element, such as hydrogen, alkyl, $-CH_2.COOH$, or $SO_2-Aryl$.

In the case of preparing the dinitro aminobenzenearsinic acid one may start not only from 3.5-dinitro-4-chlorobenzene-1-arsinic acid directly but also from the mononitro chlorin-compound which may be further nitrated to produce a 4-chloro-3.5-dinitrobenzene-1-arsinic acid, the chlorin-atom being then replaced, as above, or we may proceed from 4-chloro-3-nitrobenzene-1-arsinic acid, replacing the chlorin in this acid and introducing into the amino compound so formed a second nitro group.

In order to fully disclose our invention we will now recite in detail a number of examples embodying what we consider the preferable manner of carrying the same into effect.

Example 1: 281 grams of 4-chloro-3-nitrobenzene-1-arsinic acid, (described in German Patent No. 245536) are heated with 500 cubic centimeters of a 15 per cent. aqueous solution of ammonia to 120° in an autoclave and maintained at this temperature for two hours. A red clear solution is thus obtained and from this solution 4-amino-3-nitrobenzene-1-arsinic acid is separated by adding concentrated hydrochloric acid thereto. This compound possesses all the properties of 4-amino-3-nitrobenzene-1-arsinic acid enumerated in *Berichte der Deutschen Chemischen Gesellschaft*, vol. 44 (1911), page 3095. In order to obtain the dinitro compound from the 4-amino-3-nitrobenzene arsinic acid, 131 grams of the same are dissolved in 300 grams of monohydrate of sulfuric acid at from 5° to 10° centigrade, whereupon 150 cubic centimeters of a mixture of nitric and sulfuric acids known as "nitrating acid" are added to the whole at a temperature of from 0° to 5° C., while stirring. The temperature is then allowed to gradually rise to 15° C., during an interval of 2 hours, whereupon the whole is poured onto ice. Thereby 4-amino-3.5-dinitrobenzene-arsinic acid is obtained and may be purified in the manner set forth in *Berichte der Deutschen Chemischen Gesellschaft*, vol. 45 (1912) p. 56.

Example 2: 281 grams of 4-chloro-3-nitrobenzene-1-arsinic acid are dissolved in 680 cubic centimeters of pentanormal aqueous solution of sodium hydrate, 160 grams of the

hydrochlorid of methylamin being then added thereto and the solution heated to about 100° C., in an autoclave and maintained at this temperature for 3 hours. On adding to the dark red solution thus obtained hydrochloric acid, a yellow compound is thrown out from the same which analysis shows to have a composition corresponding to the designation, 4-methylamino-3-nitrobenzene-1-arsinic acid. On heating this latter compound it decrepitates or puffs away. It is insoluble in acetone and ether, almost insoluble in water and dilute mineral acids, and soluble with difficulty in cold alcohol. It is readily soluble in alkalis, sodium acetate solution and hot alcohol. If this mononitro compound is exposed to the action of concentrated nitric acid, not only a further nitro group becomes bound to the benzene-nucleus, but a further nitro group combines with the methylamino group, a nitramin being formed. Accordingly by heating 148 grams of this new compound, the 4-methylamino-3-nitrobenzene-1-arsinic acid, together with 550 grams of fuming nitric acid on the water bath for 2 hours the compound described in Letters Patent of the United States No. 1075279 to Ach & Rothmann, dated Oct. 7, 1913, and designated as 3.5-dinitro-4-methyl-nitraminobenzene-1-arsinic acid, is obtained.

Example 3: 163 grams of 4-chloro-3-nitrobenzene-1-arsinic acid are subjected to energetic nitration in sulfuric acid solution. It is thereby converted into 4-chloro-3.5-nitrobenzene-1-arsinic acid, taking the form of white crystals which are readily soluble in alcohol, in hot water and in strong hydrochloric acid and which decrepitate or puff away on heating. The entire quantity of this so obtained new compound is then heated in 500 grams ethyl alcohol and then mixed with 225 cubic centimeters of a 15 per cent solution of methylamin in alcohol and moderately heated on the water bath for some time (about three hours). Thereupon the major portion of the alcohol is distilled off *in vacuo* and the residue is acidulated with hydrochloric acid. Thereby the new body, 4-methylamino-3.5-dinitrobenzene-1-arsinic acid is thrown out as a yellow crystalline powder. This new compound is readily soluble in hot alcohol, glacial acetic acid and sodium-acetate solution. In alkalis it dissolves forming a reddish-brown solution. It is insoluble in mineral acids, acetone and ether. On heating, it decomposes the decomposition being attended by decrepitation or puffing away.

Example 4: 141 grams of 4-chloro-3-nitrobenzene-1-arsinic acid are dissolved in 500 cubic centimeters of hot alcohol, the solution being mixed with 150 grams of 33 per cent. alcoholic solution of dimethylamin and heated for some time (about three hours) on the water bath. The alcohol is then distilled off *in vacuo*. On cooling the new compound, 4-dimethylamino-3-nitrobenzene-1-arsinic acid is obtained in the form of yellow acicular crystals, which are recrystallized from alcohol. This new acid is readily soluble in water and acids, but insoluble in ether and acetone. On heating, it decrepitates or puffs away.

Example 5: 281 grams of 4-chloro-3-nitrobenzene-1-arsinic acid are dissolved in 620 cubic centimeters of pentanormal sodium hydrate solution, whereupon 100 grams of amino-acetic acid are added to the whole. When solution has taken place, the same is heated to 50° C., in a reflux cooler and maintained at this temperature for 30 hours. From the resultant red solution the new compound, 4-glycin-3-nitrobenzene-1-arsinic acid, is then precipitated by means of dilute sulfuric acid. This new acid is yellow in color, it is insoluble in acetone, in ether and in glacial acetic acid, but soluble in hot alcohol and in hot water. In alkali it dissolves with a yellowish-red color. On heating, it decomposes with mild decrepitation.

Example 6: 326 grams of 4-chloro-3.5-dinitrobenzene-1-arsinic acid are dissolved in 2000 cubic centimeters of normal sodium lye and 2000 cubic centimeters of ice-water, whereupon 80 grams of glycocoll or aminoacetic acid in 1060 cubic centimeters of normal sodium lye are added to the solution while stirring or otherwise agitating the same. The whole is then allowed to stand for 24 hours at a temperature of 20° C., whereby the new compound, 4-glycin-3.5-dinitrobenzene-arsinic acid is precipitated as a greenish-yellow powder. On heating the compound puffs away or decrepitates. It dissolves in alkali, the solution being red in color. It is insoluble in ether, but soluble in hot water, in alcohol, in glacial acetic acid and in acetone.

Example 7: 281 grams of 4-chloro-3-nitrobenzene-1-arsinic acid are dissolved in 620 cubic centimeters of pentanormal sodium lye together with 168 grams of benzenesulfonamid and maintained at 120° C. in an autoclave for 2 hours and then at 150° C., for 9 hours. The product of this reaction is precipitated with a dilute acid and the precipitate is then extracted with ether for the removal of the benzene-sulfonamid accompanying the same. The residue, that is to say, the undissolved 4-benzenesulfonamido-3-nitrobenzene-1-arsinic acid is thus obtained as light-brown compound, which is readily soluble in alkali as a yellow solution. It readily dissolves in water or in alcohol under the influence of heat, less readily in acetone. It is insoluble in ether. On heating it decomposes.

Example 8: 326 grams of 4-chloro-3.5-dinitrobenzene-1-arsinic acid together with 168 grams of benzenesulfonamid are added to 620 cubic centimeters of pentanormal sodium lye and maintained at a temperature of 120° C. in an autoclave for two hours, and then at 150° for 6 hours. The reaction product is then precipitated with a dilute acid and extracted with ether, as in Example 7. Thereby the new compound, 4-benzene-sulfonamido - 3.5 - dinitrobenzene - 1 - arsinic acid is obtained as a brownish body, which forms a yellow solution in alkali. On heating the compound, the same decomposes and decrepitates or puffs away. The new compound is insoluble in ether, cold glacial acetic acid and dilute acids, but soluble in the heat in water, alcohol and glacial acetic acid.

The term "amino" wherever used in the following claims is designed to cover both the group $NH_2$ and the groups in which one or both of the hydrogen atoms of the $NH_2$ group are replaced by an alkyl group or other radical. The term "meta-nitro-benzene-arsinic acid" wherever used in the claims designates nitro compounds in which one or both hydrogen atoms in the meta-position are replaced by the nitro group.

Claims:

1. The process of making meta-nitro-para-amino-benzene arsinic acids, which consists in reacting on meta-nitro-para-chloro-benzene arsinic acids with a compound of the formula $HNR_1R_2$, wherein each of the symbols $R_1$ and $R_2$ denotes a monovalent radical.

2. The process of making meta-nitro-para-amino-benzene arsinic acids, which consists in reacting on meta-nitro-para-chloro-benzene arsinic acids with an amino compound.

3. The process of making 3.5-dinitro-4-amino-benzene arsinic acid which consists in reacting on 3.5-dinitro-4-chloro-benzene arsinic acid with a compound of the formula $HNR_1R_2$, wherein each of the symbols $R_1$ and $R_2$ denotes a monovalent radical.

4. The process of making 3.5-dinitro-4-amino-benzene arsinic acids, which consists in reacting on 3.5-dinitro-4-chloro-benzene arsinic acid with an amino compound.

5. The process of making a meta-nitro-para-methylamino-benzene arsinic acid compound, which consists in reacting on a meta-nitro-para-chloro-benzene arsinic acid compound with methylamin.

6. The process of making 3.5-dinitro-4-methylamino-benzene arsinic acid, which consists in reacting on 3.5-dinitro-4-chloro-benzene arsinic acid with methylamin.

7. As a new class of chemical compounds the 3.5-dinitro-4-amino-benzene arsinic acids of the general formula

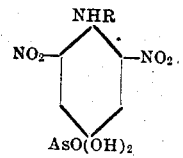

(where R designates any monovalent radical) which are solid crystalline substances of yellow or brownish color, insoluble at the ordinary temperature in water and most organic solvents, insoluble in dilute mineral acids, soluble in alkalis and sodium acetate solution and slightly soluble in hot alcohol and acetone, decomposing on heating.

8. As a new composition of matter the 3.5-dinitro-4-methylamino-benzene arsinic acid possessing the formula

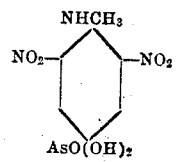

which is readily soluble in hot alcohol, glacial acetic acid and sodium acetate solution, insoluble in mineral acids, acetone and ether, dissolving in alkalis, forming a reddish-brown solution, decomposing on heating by decrepitation.

In testimony whereof we hereunto affix our signatures in the presence of two witnesses.

LORENZ ACH.
ALBERT ROTHMANN.
HANS HATZIG.

Witnesses:
 HERMANN DIETERICH,
 S. S. BERGER.